United States Patent [19]

Berg

[11] 4,377,738

[45] Mar. 22, 1983

[54] METHOD OF CONTROLLING THE TEMPERATURE OF AN ELECTRICALLY HEATED ELEMENT

[75] Inventor: Bernard J. Berg, Kentwood, Mich.

[73] Assignee: Foresight Enterprises, Incorporated, Grand Rapids, Mich.

[21] Appl. No.: 10,352

[22] Filed: Feb. 8, 1979

Related U.S. Application Data

[63] Continuation of Ser. No. 761,463, Jan. 22, 1977, abandoned.

[51] Int. Cl.$^3$ .............................................. H05B 1/02
[52] U.S. Cl. .................................... 219/490; 219/493; 219/491; 219/494; 219/512; 156/583.9
[58] Field of Search ............... 219/243, 501, 492, 493, 219/494, 490, 512, 507, 233; 156/583.9, 583.7, 515

[56] References Cited

U.S. PATENT DOCUMENTS

| | | | |
|---|---|---|---|
| 2,898,436 | 8/1959 | Lawler | 219/497 |
| 3,627,983 | 12/1971 | Pickering | 219/243 |
| 3,679,518 | 7/1972 | Andler et al. | 219/492 |
| 3,681,569 | 8/1972 | Schwarz | 219/492 |
| 3,751,632 | 8/1973 | Kavranen | 219/492 |
| 3,813,516 | 5/1974 | Kudsi et al. | 219/216 |
| 3,858,141 | 12/1974 | Lackey | 219/492 |
| 3,912,575 | 10/1975 | Zelnick | 219/494 |

FOREIGN PATENT DOCUMENTS

| | | | |
|---|---|---|---|
| 2605533 | 8/1977 | Fed. Rep. of Germany | 219/492 |
| 839551 | 6/1960 | United Kingdom | 219/492 |

*Primary Examiner*—Roy N. Envall, Jr.
*Assistant Examiner*—M. H. Paschall
*Attorney, Agent, or Firm*—Glenn B. Morse

[57] ABSTRACT

The temperature of an electrically heated element is controlled by applying a current until the element reaches a threshold temperature, preferably determined by the expanded length of the elements, and then applying a predetermined voltage-current condition for a selected period of time. This is followed by repeated applications of such voltage-current conditions in response to the cooling of the heating element back to the threshold temperature.

4 Claims, 3 Drawing Figures

METHOD OF CONTROLLING THE TEMPERATURE OF AN ELECTRICALLY HEATED ELEMENT

This is a continuation of application Ser. No. 761,463, filed Jan. 22, 1977 now abandoned.

BACKGROUND OF THE INVENTION

The extensive use of thermoplastic materials in packaging and in other fields has resulted in widespread use of so-called "hot wire" devices to cut these materials, and to weld them together. Frequently the cutting and the welding are combined in one operation, in which overlaid thin sheets are welded together to form a seam along the line in which they are cut. The welding results from the elevation of the temperature by the hot wire to a point at which the material is plasticized or liquefied.

The temperature of the hot wire is maintained by treating it as an electrical resistance element. It is important that this temperature be controlled within relatively narrow limits, in order to assure that the temperature is both high enough to form the cutting and sealing effectively, and yet low enough to avoid burning the material. The latter condition usually results in accumulations of the burned material on the heating element, and interferes with its functioning. The usual arrangement for controlling the temperature of the hot wire is through monitoring the expanded length of the wire by causing it to actuate appropriately-placed switching devices. Present standard practice is to provide off-on conditions of the current traversing the hot wire corresponding to the peak and threshold temperatures as determined by the expanded length of the element. This procedure produces a number of problems. One of these is the inevitable trial-and-error procedure that becomes necessary in calibrating any new heating element, which must necessarily be periodically replaced as a result of wear and accident. Another problem with this form of control is the necessity for readjustment as the heating element accumulates residue from the sealed materials. A third problem is the obvious interference with monitoring the expanded length, as a result of lateral pressure on the heating element during the sealing and cutting process. It is also obvious that these same problems make it very difficult to determine and maintain an appropriate dwell time at which the sealing wire is held in contact with the sealed materials.

SUMMARY OF THE INVENTION

The procedure provided by the present invention controls the temperature of the heating element in essentially two different steps, the latter being successively repeated during the period of operation of the machine. The first of these steps is the application of electrical current to the heating element to raise it to the threshold temperature, corresponding to the lowest temperature at which the device will operate satisfactorily. On the attainment of this temperature, the heating element is subject to predetermined voltage-current conditions for a selected period of time, after which the current is either shut off or reduced to a relatively low level. The cooling of the heating element back to the threshold temperature initiates a successive application of voltage-current conditions for another time period, thus maintaining the temperature of the heating element between the desired upper and lower limits. This system utilizes a definite relationship between the time of application of these voltage-current conditions and the resulting temperature attained by the heating element.

DESCRIPTION OF THE PREFERRED EMBODIMENTS

Figure 1:
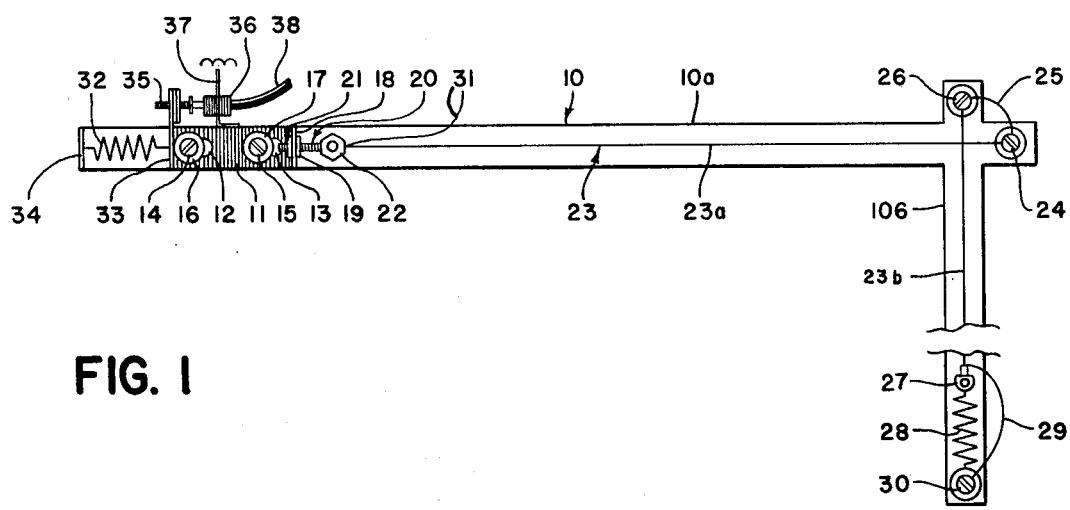
FIG. 1 is a schematic view of a conventional assembly in which a heating element is installed in an L-shaped configuration on a structural arm.

Referring to FIG. 1, the L-shaped beam 10 having the mutually perpendicular sections 10a and 10b is to be considered as a standard component of a sealing machine, which provides a conventional arrangement for raising and lowering the arm with respect to sheets of thermoplastic material. The U-shaped slide member 11 has a pair of elongated holes 12 and 13 in the base, which are traversed respectively by the screws 14 and 15 and by portions of the bushings 16 and 17 associated respectively with these screws. The leg 18 of the U-shaped slide member 11 is provided with an insulator 19 receiving the adjusting screw 20, which traverses the leg 18, and is held with respect to the assembly by the adjusting nut 21. The head 22 of the screw 20 provides a terminal for the hot wire 23, which extends to the insulated mounting post 24 secured to the beam 10. A loop 25 of the wire 23 provides a jumper to the insulated mounting post 26, from which the wire 23 extends to the insulator 27 connected to the free end of the tension spring 28. The opposite end of the spring 28, together with the loop 29 in the wire 23, are connected to the mounting post 30 secured to the end of the beam section 10b. This arrangement places the wire sections 23a and 23b in series relationship electrically, through the loops 25 and 29, between the post 30 and the opposite end 31, which are electrically connected into the energizing circuit. Tension in the section 23a is maintained by the action of the spring 32 extending between the leg 33 of the U member 11 and the abutment 34 on the beam section 10a. The action of the spring 32 urges the slide member 11 to the left, within the freedom of movement provided by the elongated holes 12 and 13.

The leg 33 of the slide member 11 extends laterally to provide a mounting for the screw 35, which is an adjustable actuator for the switch 36. The switch is mounted on a suitable bracket 37 secured to the side of the beam section 10a independently of the slide member 11. Electrical leads 38 associate this switch with the circuit illustrated in FIG. 3. Tension in the wire section 23a is initially set by the adjustment of the nut 21. This adjustment is normally established so that the leg 33 is just barely touching the bushing 16 when the unit is at room temperature. Calibration is then made by rotating the screw 35 so that the slide member 11 must move a given amount before the switch 36 opens. The elongation of the wire section 23a, in conjunction with the tension in the spring 32, will induce this movement as electrical power is applied to the heating element.

Figure 2:
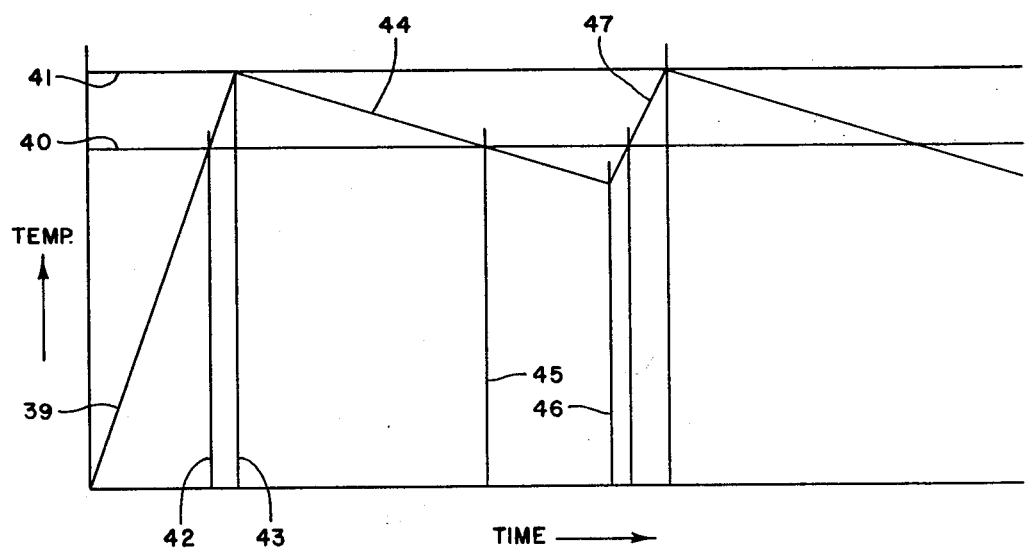
FIG. 2 is a graph showing the temperature resulting from the application of the various sequences of electrical current.

The control of the temperature in the hot wire 23 proceeds in two phases. The first of these is the application of electrical power until the temperature in the element 23a has risen sufficiently to permit the slide member 11 to move to the left under the action of the spring 32 to the point that the adjustable actuator 35 permits the switch 36 to open. Referring to FIG. 2, the point at which the electrical power begins to be applied is associated with the origin of the chart. With increase in time, the application of power results in an increase in temperature along the line 39 until the temperature level indicated at 40 is reached where the switch 36 opens. The opening of this switch actuates a time-determined continued application of power established to raise the temperature to the level indicated at 41. The temperature in the heating element is approximately proportional to the time of the application of a known electrical power. The times associated with the temperature levels 40 and 41 are respectively indicated at 42 and 43. After the application of power for the known time span between 42 and 43, the temperature in the heating element cools down along the line 44 until the temperature level at 40 has been reached, where the switch 36 is again closed. This occurs at the time point indicated at 45. There is, of necessity, a certain amount of time override before the application of power at the time point 46 begins to produce the increase in temperature along the line 47. As this line crosses the temperature level 40, the switch 36 opens, and the time-controlled phase of the application of power continues as before. These cycles are repeated indefinitely as the machine is used.

Figure 3:
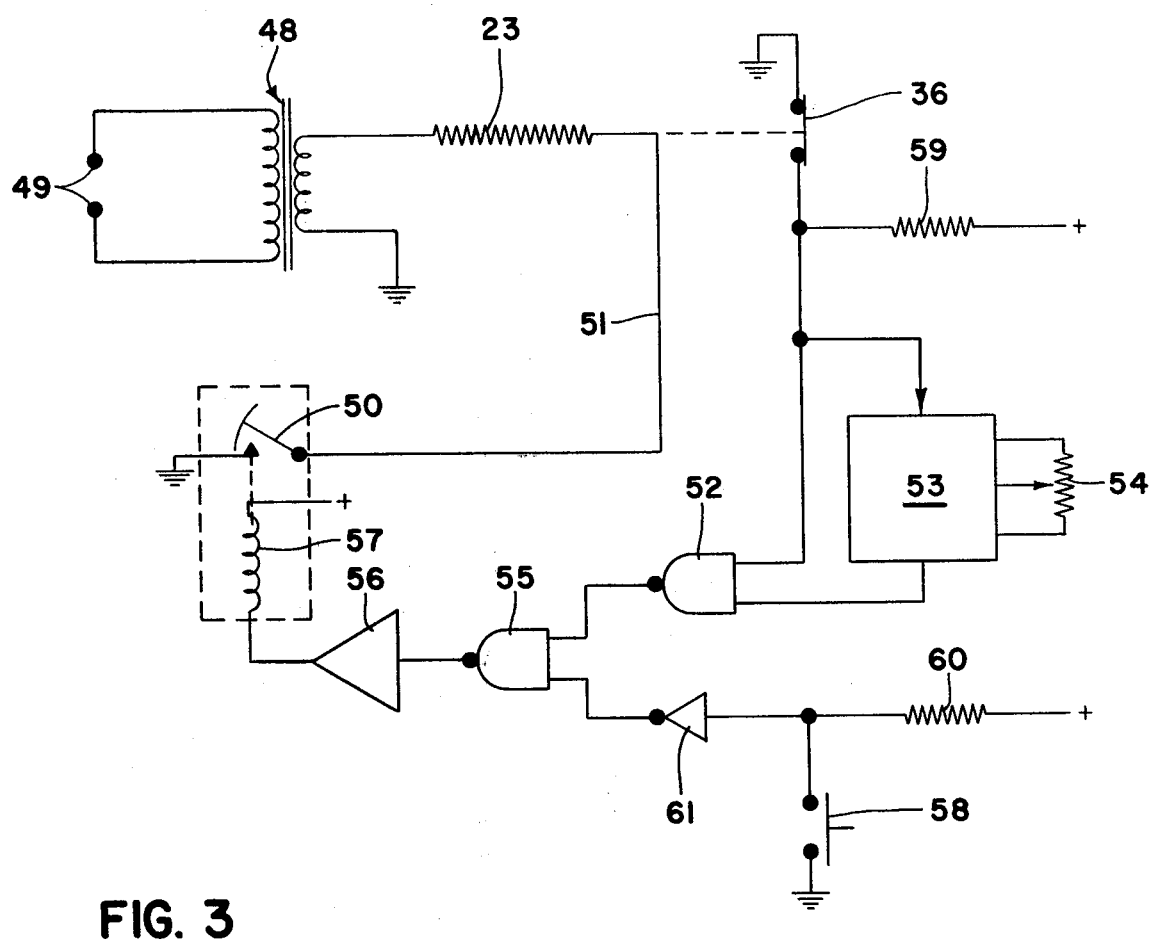
FIG. 3 is a diagram showing the relationship of the electrical components preferred for establishing the voltage-current conditions involved in the present invention.

Referring to the circuit diagram in FIG. 3, the sealing element 23 is powered by the transformer 48 energized from the line terminals 49. Power is applied through the relay contacts 50 and the lead 51. When the switch 36 opens as the heating element expands, this generates a condition in the Nand Gate 52 and in the time delay circuit 53. The time delay circuit produces an output that is also applied to the Nand Gate 52 at a time somewhat later, adjustable by the potentiometer 54. When both inputs to the Nand Gate 52 are present, the output from this unit establishes a condition in the Nand Gate 55 causing the relay driver 56 to deenergize the relay coil 57 so that the contacts 50 are opened. The sealing element power is normally initiated in the circuit only when the switch 58 is closed, which corresponds to the active position of the assembly shown in FIG. 1. The resistors 59 and 60 are used to establish the conditions required to control the Nand Gates 52 and 55. The unit 61 is an invertor having the effect of reversing conditions on the Nand Gate 55.

I claim:
1. A method of controlling the temperature of an electrical resistance heating element comprising:
    (a) applying current to said element until a predetermined threshold temperature of said element is reached;
    (b) continuing the application of current to said element for a predetermined time period commencing at the time at which said element reaches said predetermined threshold temperature;
    (c) upon termination of said time period, discontinuing current flow to said element until the temperature thereof falls below said predetermined threshold temperature; and
    (d) repeating, in sequence, steps a, b and c.
2. A method as defined in claim 1, wherein said threshold temperature is determined by the length of said element as it increases with increased temperature.
3. A circuit for controlling the temperature of an electrical resistance heating element comprising:
    a power supply circuit;
    temperature responsive switch means for connecting said element to said power supply circuit and operative to open when said element reaches a predetermined temperature; and
    timing circuit means responsive to the opening of said switch means and operative to connect said element to said power supply circuit for a predetermined time interval commencing with the opening of said switch means.
4. A circuit for controlling the temperature of an electrical resistance heating element comprising:
    a power supply circuit including first switch means for energizing and de-energizing said heating element;
    a temperature responsive switch operative to open when the temperature of said heating element rises above a predetermined threshold temperature;
    timing circuit means operative to produce an output signal for a predetermined time interval commencing with the opening of said temperature responsive switch; and
    an actuating circuit controlling said first switch means, said actuating circuit being controlled by said temperature responsive switch and said timing circuit means and functioning to actuate said first switch to energize said heating element when said temperature responsive switch is closed or said output signal is present.

* * * * *